United States Patent [19]

Wilson

[11] Patent Number: 5,188,385
[45] Date of Patent: Feb. 23, 1993

[54] AUTOMATIC LOCKING PROXIMITY TRAILER HITCH

[76] Inventor: Harold L. Wilson, Rte. 2, Box 394, Pevely, Mo. 63070

[21] Appl. No.: 724,868

[22] Filed: Jul. 2, 1991

[51] Int. Cl.⁵ .......................... B60D 1/00; B60D 1/16
[52] U.S. Cl. .................. 280/477; 280/479.2; 280/479.3
[58] Field of Search .................. 280/477, 479.1, 479.2, 280/479.3

[56] References Cited

U.S. PATENT DOCUMENTS 3,989,270 11/1976 Henderson .................. 280/479.3
4,773,667 9/1988 Elkins .................. 280/479.3

Primary Examiner—Mitchell J. Hill
Attorney, Agent, or Firm—Robbins & Robbins

[57] ABSTRACT

A trailer hitch is provided for a vehicle equipped for the tongue of a trailer with provisions for moving the hitch in and out of the tongue and for angular movement where the tongue is not aligned. The hitch is anchored to an advancing mechanism within the tongue such that the advancing mechanism, when the hitch is connected to the ball, can draw the tongue and hitch together to a hitch connected position. The hitch has a tapering rear portion which cams into the tongue to provide alignment as the hitch is drawn into the interior of the tongue. The advancing mechanism comprises a gear rack and pinion and a loose interfitting ring connecting the rack to a tapered rear camming portion of the hitch. The advancing mechanism, by movement of the rack within the tongue, engages a hitch socket lock and a latch to connect the tongue and hitch together automatically in the hitch connected position.

19 Claims, 3 Drawing Sheets

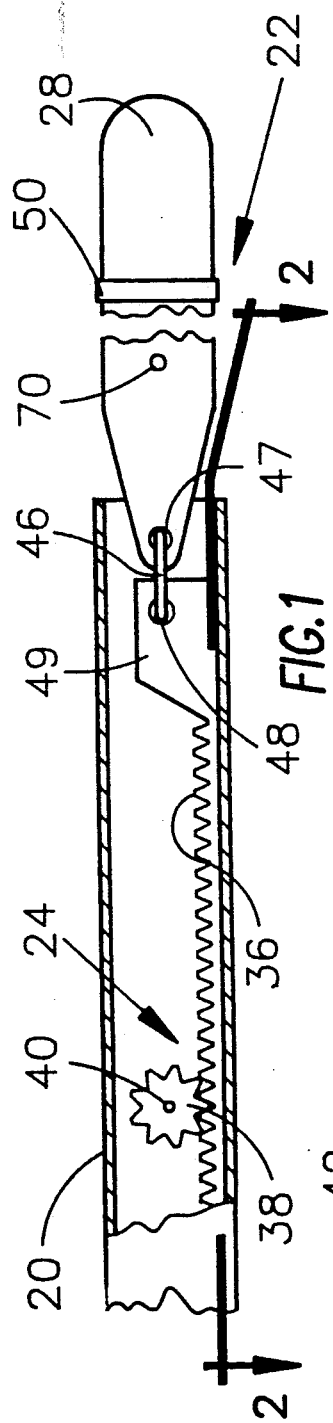
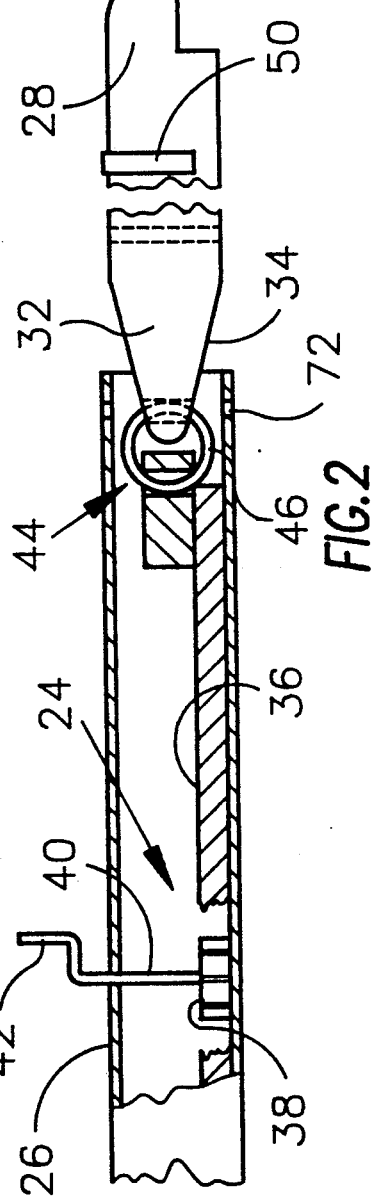
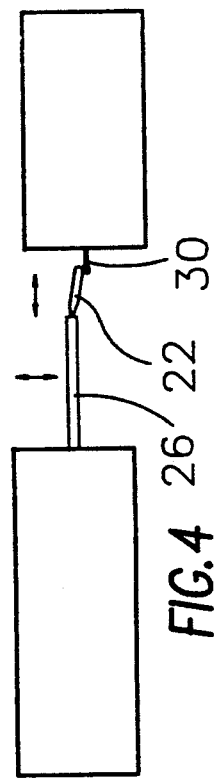
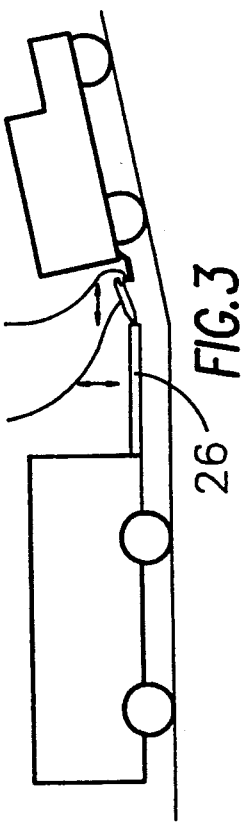

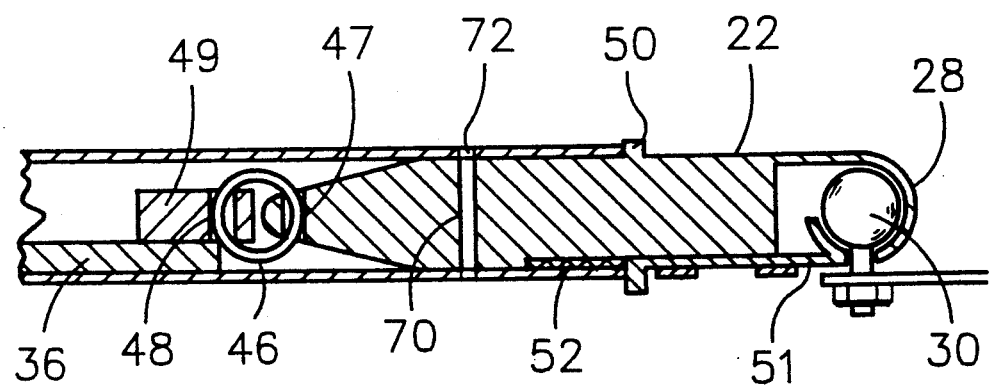
FIG.5
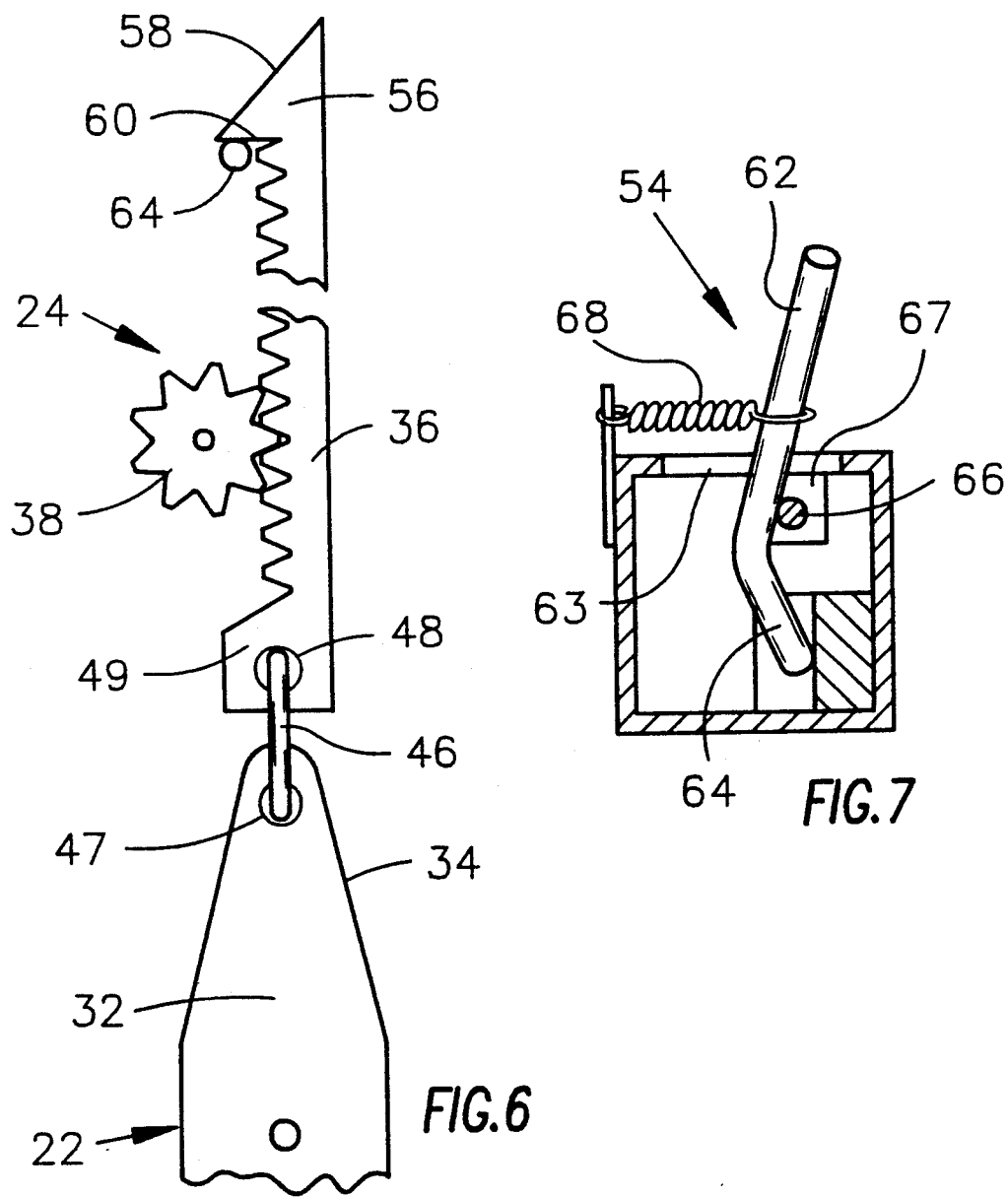
FIG.6
FIG.7

AUTOMATIC LOCKING PROXIMITY TRAILER HITCH

BACKGROUND OF THE INVENTION

In the past there has been a need for easily connecting trailers to vehicles by a conventional ball and socket hitch. Such hitches comprise a ball supported at the rear of the vehicle and a socket at the front of trailer tongue. In the hitching operation, care must be taken to line up the vehicle with the trailer tongue in such a manner that the trailer tongue is closely aligned with the ball in such a manner that the ball and socket are at the same elevation and in registry with one another. Such an operation may require two people for signalling one another and several attempts before proper alignment and registry are obtained for a successful hitch. When registry is obtained, a locking of the hitch to lock the socket may be required.

Various devices have been proposed in the past including wheeled stand jacks or the like. Such jacks often cannot be moved readily, are easily broken off or jammed. Also so-called proximity hitches have been designed whereby a socket hitch may be moved in and out of the tongue with universal movement to move the socket up and down and left and right. While such devices are an improvement over a rigid socket hitch connected to a tongue, manual movement by a hitch advancing means may be required for the precise adjustment of the hitch as well as further operations to lock the hitch together and the socket to the ball.

SUMMARY OF THE INVENTION

By means of this invention, there has been provided a hitch which may be moved in and out of a trailer tongue for relatively simple engagement of a socket portion carried by the hitch with a ball carried by the vehicle to which the trailer is to be hitched. The hitching operation may be easily carried out when the tongue and the ball are in general proximity to one another but still separated both in vertical and horizontal directions by several inches.

The hitch connection is achieved even though the ball and socket are not in alignment by providing the hitch with relative movement inside and out of the tongue. In the initial connection the hitch is advanced longitudinally and forwardly of the tongue by connection to a hitch advancing mechanism such as a gear rack and pinion which may be operated by the user.

The hitch is moved longitudinally by operation of the rack and pinion and by a universal connection of the hitch to the rack, a socket portion of the hitch can be moved upwardly, downwardly and horizontally, left or right, to general registry with the ball. While the tongue advancing mechanism provides for a general longitudinal adjustment of the hitch, a further degree of longitudinal adjustment is provided by the designs of the universal connection between the hitch and the rack. This is effected by an interfitting loose ring connection between a rear portion of the hitch and the advancing rack which provides not only universal adjustment but longitudinal adjustment of about one-half inch or so which enhances greatly the interfitting of the ball and socket.

Once the ball and extended hitch socket have been connected, the tongue is advanced and the hitch is retracted and drawn into a hollow portion of the tongue. Even though the hitch and tongue are not in alignment and are angularly disposed with one another, alignment is automatically effected by the camming action of a tapered rear nose portion of the hitch. As the hitch is retracted, the tapered surfaces of the nose are withdrawn in the hollow tongue and alignment is effected as the hitch is withdrawn into the tongue.

As the hitch is fully withdrawn into the tongue, a socket lock carried by the hitch is actuated by the tongue and moved into a socket retained position around the ball. Simultaneously with this operation the rack operates a latch mounted on the tongue to latch and lock the rack firmly within the tongue to complete the hitching operation.

The hitch is simply disengaged by operating a handle to disengage the latch while moving the rack to separate the tongue from the hitch to disengage the socket lock. The hitch is simple to operate and particularly useful by a single operator to perform the hitching operation with efficiency and a minimum of effort.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

FIG. 1 is a top plan view of the hitch assembly;

FIG. 2 is a view in section taken on line 2—2 of FIG. 1;

FIG. 3 is a schematic side view of the trailer and hitch;

FIG. 4 is a schematic top plan view of the trailer and hitch;

FIG. 5 is a fragmentary view partly in vertical section showing the hitch and socket lock construction;

FIG. 6 is a fragmentary top plan view showing the hitch and gearing;

FIG. 7 is a rear end view showing the latch; and

DESCRIPTION OF THE INVENTION

Figure 8:
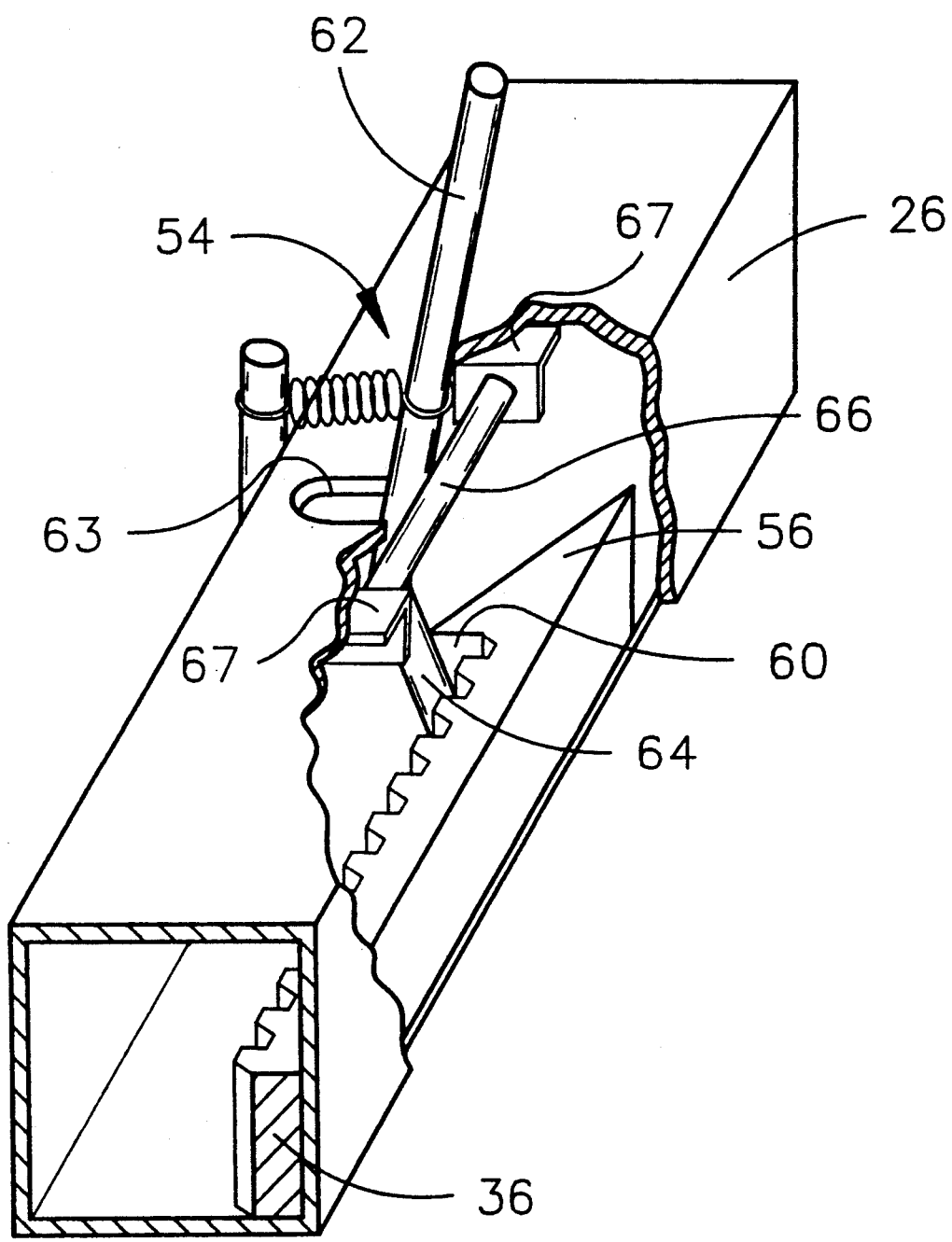
FIG. 8 is a pictorial view showing the latch and gear rack.

The hitch assembly of this invention is generally indicated by the reference numeral 20 in FIG. 1. It is comprised of a forward main hitch 22 universally connected to a tongue advancing mechanism 24 disposed within a hollow trailer tongue 26.

The hitch 22 is comprised of a socket 28 adapted to be connected to a conventional ball 30 mounted at the rear of a vehicle to which the trailer tongue is to be connected. The rear portion of the hitch 22 is in the form of a tapered nose 32 having slanting surfaces 34 which act as a cam when the hollow trailer tongue is advanced by operation of the tongue advancing mechanism from an unaligned position as will be further described.

The tongue advancing mechanism is comprised a gear rack 36 and pinion 38. The pinion 38 is supported on a shaft 40 and operated by a hand crank 42 mounted exteriorly of the trailer tongue to advance or retract the rack within the hollow square tubing of the trailer tongue and by so doing, effect a like movement to the hitch to which it is anchored by a universal connection 44 which provides for vertical and horizontal movement of the hitch 22 with respect to the tongue and rack. While the tongue advancing mechanism has been shown in the form of a manually operated rack and pinion, it will be understood that hydraulic, pneumatic or motor operated means may be used as desired.

The universal connection 44 is comprised of a ring 46 loosely connected through a hole 47 in the tapered nose 32 of the hitch 22 and fitting loosely through an opening 48 in a plate 49 connected to the front of the rack 36. The interfit of the ring 46 as shown in FIGS. 1, 2 and 5 permits universal movement vertically, i.e., up and down and horizontally, i.e., left and right. In addition, the design of the loosely interfitting ring in the openings permits the hitch 22 to move longitudinally, i.e., back and forth. This permits a fine adjustment of one-half inch, more or less, independent of the rough adjustment of the tongue advancing mechanism and crank 42 to provide ease in longitudinal registry of the socket 28 of the hitch with the trailer ball.

The tongue advancing mechanism uses the hitch 22 as an anchor once the socket has been fitted over the trailer ball. The square tubular tongue is advanced upon cranking of the gear handle 42 as the tapered nose is drawn into the tongue and the two are cammed into alignment and the hitch 22 by virtue of its congruent square cross-section is aligned inside the square cross-sectional tongue.

As alignment is effected and the hitch and tongue are cranked together to move the tongue against stop 50, a socket lock 51, best shown in FIG. 5 is contacted by the front of the tongue and moved forwardly to a socket looked position to capture the ball 30. The socket lock is mounted for slidable movement in the bottom of the hitch and is biased toward a rear underlocked position by spring 52.

In order to hold automatically the hitch 22 and trailer tongue in the hitch connected position a latch 54 is provided. The latch is actuated by the advancement of the tongue advancing mechanism to the completed hitch connected position when the trailer tongue is fully advanced against the stop 50 to enclose the rear portion of the hitch 22. This is effected by a latch operating barb 56 mounted on the rear of the rack 36 which contacts the spring biased latch and by cammed surface 58 causes it to open and then close behind the vertical stop surface 60. When this is effected, the tongue is firmly latched to the rack 36 and hitch 22 with the hitch assembly locked together and the trailer ready for towing.

The latch construction is best shown in FIGS. 6, 7 and 8. The latch 54 is comprised of a handle 62 extending through a slot 63 exteriorly of the tongue and a lower barb contacting portion 64. An axle 66 mounted on journals 67 is rigidly connected to the latch 54 to support it for movement about a horizontal longitudinal axis against a biasing spring 68. The latching occurs automatically in the hitch connecting operation as the barb 56 on the gear moves past the lower latch portion 64 and cams it to the latch position at the back of the barb. When the hitch is to be disconnected the handle 62 serves to rotate and disengage the latch portion 64 from the back of the barb to free the gear rack 36 in order that it may be cranked in reverse to separate the tongue from the hitch 22 and release the socket lock 50. The hitch 22 may then be removed from the ball 30 to complete the unhitching operation.

USE

The hitching operation is simply carried out by a user by the usual backing of the vehicle containing the rear mounted trailer hitch ball to the close proximity with the front of the tongue. This may be generally within a half foot, more or less, which may be accomplished without the usual backing, forwarding, turning or the like required for the precise alignment required in conventional fixed ball and socket hitches.

The user with the trailer tongue in the unaligned positions shown in FIGS. 3 and 4 then operates the handle 42 in a manner to extend the gear rack 36 and the hitch 22 forwardly or rearwardly in order that the socket 28 of the hitch 22 may be fitted over the hitch ball 30. The hitch 22 may be raised or lowered or moved laterally to either side through the universal connection 44 and the loose interfitting ring connection. This connection also permits a slight extension or retraction of the hitch of about one-half inch or so, which permits a rough adjustment by the handle 42 in the positioning of the hitch freeing the user's attention in the placing of the hitch socket 28 upon the hitch ball 30.

Upon the emplacement of the extended hitch 22 upon the trailer ball the tongue is advanced and drawn up to the hitch 22 using the hitch as an anchor by operating the rack and pinion handle 42. The hitch connection is completed when the tongue is advanced to the point where the front of the tongue contacts the stop 50 and moves the socket lock 51 to the ball engaged position under the hitch socket.

As the tongue is moved to the hitch connected position, the lower part 64 of the latch 54 is contacted by the slanted cam face 58 of the barb 56 on the gear rack 36. With continued movement as the hitch connected position is reached, the latch lower part 64 is moved past the barb and by the biasing spring is latched behind the stop surface 60 of the barb. This action firmly latches the hitch assembly to present the trailer ready for towing. A safety lock pin (not shown) may be pinned through registering openings 70 and 72 in the hitch 22 and tongue as desired.

When the hitch is desired to be disconnected, the latch handle 62 is operated to move the lower portion 64 out of the latched position to permit the crank handle to be reversely operated to separate the tongue from the hitch 22. As this is effected, the socket lock 51 is freed by the biasing action of the spring 52 to permit the hitch 22 and socket 28 to be separated from the hitch ball 34 to complete the unhitching operation.

Various changes and modifications may be made within this invention as will be apparent to those skilled in the art. Such changes and modifications are within the scope and teaching of this invention as defined in the claims appended hereto.

What is claimed is:

1. A trailer hitch for connecting a vehicle to a trailer through a hitch ball connected to said vehicle and a ball socket connected to said trailer, said hitch comprising an adjustable hitch member connected to a tongue of said trailer at a rear portion and the ball socket at a forward portions adjustment means for adjusting said hitch member to provide universal vertical and horizontal movement and longitudinal movement of the ball socket for alignment of the ball socket from unaligned positions to a registry position with the hitch ball and tongue advancing means for moving said tongue toward said hitch member to a locked position within said tongue.

2. The trailer hitch of claim 1 in which said adjustment means comprises a ring on said adjustable hitch member loosely connected to said tongue advancing means to provide universal and longitudinal adjustment of said hitch member.

3. The trailer hitch of claim 2 in which said ring is loosely interfitted within openings provided in said tongue advancing means and said hitch member.

4. The trailer hitch of claim 1 in which said tongue advancing means is operable to engage a spring biased socket lock engageable by said tongue and mounted for slidable movement on said hitch member to provide a hitch ball receiving relation with the ball socket.

5. The trailer hitch of claim 1 in which a latch means is provided operable by said tongue advancing means to lock the hitch member to said tongue in a hitch fully connected position.

6. The trailer hitch of claim 1 in which said tongue advancing means is operable to engage a spring biased socket lock mounted for slidable movement on said hitch member to provide a hitch ball receiving relation with the ball socket and a latch means is provided operable by said tongue advancing means to lock the hitch member to said tongue in a hitch fully connected position.

7. The trailer hitch of claim 1 in which said tongue has a hollow forward portion, said hitch member having a tapered rear portion receivable in camming relation with an open front portion of said tongue as the tongue advancing means is operated to align the hitch member and the tongue.

8. The trailer hitch of claim 7 in which the hitch member has an intermediate portion having a square cross section congruent with a square cross section of the hollow portion of the tongue and closely receivable therein in telescopic relation as the tongue advancing member is advanced to a hitch member connected position.

9. The trailer hitch of claim 1 in which a latch member is mounted on said tongue, said latch member being engageable by the tongue advancing means when moved to the hitch connected position to latch said hitch member within said tongue.

10. The trailer hitch of claim 1 in which said tongue advancing means comprises a gear rack mounted for relative movement with said tongue and within a hollow forward position of said tongue, means for powering said rack comprising a gear pinion engageable with said rack, said adjustment means comprising a ring on said hitch member loosely connected to a forward portion of said rack to provide universal and longitudinal adjustment of said hitch member.

11. The trailer hitch of claim 10 in which a latch member is mounted in the hollow portion of said tongue, said latch member being engageable by said rack when moved to a hitch connected position to latch said hitch member firmly within said tongue.

12. The trailer hitch of claim 9 in which said latch member comprises a spring biased latch element which is engageable with a barb connected to said gear rack when moved to the hitch connected position.

13. The trailer hitch of claim 12 in which a handle is mounted on said latch exteriorly of the tongue to release said latch to provide for reversal of the tongue advancing means.

14. A trailer hitch for connecting a vehicle to a trailer through a hitch ball connected to said vehicle and a ball socket connected to said trailer, said hitch comprising an adjustable hitch member connected to a tongue of said trailer at a rear portion and the ball socket at a forward portion, adjustment means for adjusting said hitch member to provide universal vertical and horizontal movement of the ball socket for alignment of the ball socket from unaligned positions to a registry position with the hitch ball and tongue advancing means for moving said tongue toward said hitch member to a locked position within said tongue, said tongue advancing means being operable to engage a spring biased socket lock engageable by said tongue and mounted for slidable movement on said hitch member to provide a hitch ball receiving relation with the ball socket.

15. A trailer hitch for connecting a vehicle to a trailer through a hitch ball connected to said vehicle and a ball socket connected to said trailer, said hitch comprising an adjustable hitch member connected to a tongue of said trailer at a rear portion and the ball socket at a forward portion, adjustment means for adjusting said hitch member to provide universal vertical and horizontal movement of the ball socket for alignment of the ball socket from unaligned positions to a registry position with the hitch ball and tongue advancing means for moving said tongue toward said hitch member to a locked position within said tongue, said tongue advancing means being operable to engage a spring biased socket lock engageable by said tongue and mounted for slidable movement on said hitch member to provide a hitch ball receiving relation with the ball socket, a latch means is provided operable by said tongue advancing means to lock the hitch member to said tongue in a hitch fully connected position.

16. The trailer hitch of claim 14 in which a latch member is mounted on said tongue, said latch member being engageable by the tongue advancing means when moved to the hitch connected position to latch said hitch member within said tongue.

17. The trailer hitch of claim 15 in which said latch means comprises a spring biased latch element which is engageable with a barb connected to said gear rack when moved to the hitch connected position.

18. The trailer hitch of claim 17 in which a handle is mounted on said latch element exteriorly of the tongue to release said latch means to provide for reversal of the tongue advancing means.

19. The trailer hitch of claim 16 in which said tongue advancing means is operable to engage the tongue with a stop element mounted on the hitch member at the hitch connected position when said socket lock and latch member are fully engaged in the hitch connected position.

* * * * *